(12) United States Patent
Freeman et al.

(10) Patent No.: US 7,762,714 B2
(45) Date of Patent: Jul. 27, 2010

(54) METHOD AND SYSTEM FOR ADMINISTERING MICRO-INGREDIENT FEED ADDITIVES TO ANIMAL FEED RATIONS

(75) Inventors: Steve R. Freeman, Windsor, CO (US); Charles H. Hoff, Bellvue, CO (US)

(73) Assignee: Lextron, Inc., Greeley, CO (US)

(*) Notice: Subject to any disclaimer, the term of this patent is extended or adjusted under 35 U.S.C. 154(b) by 986 days.

(21) Appl. No.: 11/422,803

(22) Filed: Jun. 7, 2006

(65) Prior Publication Data
US 2006/0216332 A1 Sep. 28, 2006

Related U.S. Application Data

(63) Continuation-in-part of application No. 10/633,463, filed on Jul. 31, 2003, now Pat. No. 7,325,967.

(51) Int. Cl.
G01G 11/14 (2006.01)
B01F 15/02 (2006.01)

(52) U.S. Cl. .................... 366/152.2; 222/1; 177/4; 177/66; 141/1; 141/83; 73/434

(58) Field of Classification Search ........... 366/152.2; 73/434; 141/1, 83; 222/1, 30, 55, 71; 177/1, 177/4, 50, 66
See application file for complete search history.

(56) References Cited

U.S. PATENT DOCUMENTS

| | | | |
|---|---|---|---|
| 2,746,728 A | 5/1956 | Pomerleau | |
| 3,174,648 A | * 3/1965 | Nelson | .......... 222/56 |
| 3,437,075 A | 4/1969 | Hawes | |
| 3,498,311 A | 3/1970 | Hawes | |
| 3,670,923 A | 6/1972 | Hawes, Jr. et al. | |
| 3,741,440 A | 6/1973 | Sanders, Jr. | |
| 3,741,533 A | 6/1973 | Winn, Jr. | |
| 3,804,303 A | 4/1974 | Fassauer | |
| 3,806,001 A | 4/1974 | Pratt | |
| 3,822,056 A | 7/1974 | Hawes, Jr. et al. | |
| 3,881,688 A | 5/1975 | Senn | |
| 3,981,417 A | 9/1976 | Fassauer | |

(Continued)

OTHER PUBLICATIONS

"Acuity Laser Measurement AR200 Laser Measurement Sensors In Wafer Fabrication"; Schmitt Measurement Systems, Inc.; 2004; 1 page.

(Continued)

Primary Examiner—Tony G Soohoo
(74) Attorney, Agent, or Firm—Sheridan Ross PC (57) ABSTRACT

A system and method are provided for administering micro-ingredient feed additives or supplements to feed rations. The amount of each particular micro-ingredient to be delivered to a feed ration may be determined by a bulk density measurement. Alternatively, bulk density measurement may be used in combination with existing weight measurement and volumetric metering methods for multiple micro-ingredients. Delivery by bulk density requires determination of a bulk density value along with use of a dispensing device that dispenses a calculated amount of the micro-ingredient ration. The dispensing calculation may be achieved by analysis of delivery time, pulse count, or some other quantitative measure such as magnitude. Use of bulk density as a measurement technique eliminates the requirement for use of scales in the micro-ingredient delivery system.

13 Claims, 4 Drawing Sheets

U.S. PATENT DOCUMENTS

| | | | |
|---|---|---|---|
| 4,086,663 A | 4/1978 | Croft | |
| 4,395,131 A | 7/1983 | Barlow | |
| 4,430,001 A | 2/1984 | Schurr | |
| 4,542,162 A | 9/1985 | Rutherford et al. | |
| 4,643,582 A | 2/1987 | Ricciardi | |
| 4,733,971 A | 3/1988 | Pratt | |
| 4,801,210 A | 1/1989 | Gian | |
| 4,815,042 A | 3/1989 | Pratt | |
| 4,889,433 A | 12/1989 | Pratt | |
| 4,899,443 A | 2/1990 | Beermann | |
| 4,910,024 A | 3/1990 | Pratt | |
| 5,219,224 A | 6/1993 | Pratt | |
| 5,240,324 A | 8/1993 | Phillips et al. | |
| 5,280,859 A | 1/1994 | Rust et al. | |
| 5,284,388 A | 2/1994 | Volk et al. | |
| 5,303,998 A | 4/1994 | Whitlatch et al. | |
| 5,340,211 A | 8/1994 | Pratt | |
| 5,350,257 A | 9/1994 | Newbolt et al. | |
| RE34,776 E * | 11/1994 | Pratt | 366/141 |
| 5,369,032 A | 11/1994 | Pratt | |
| 5,401,501 A | 3/1995 | Pratt | |
| 5,423,455 A * | 6/1995 | Ricciardi et al. | 222/1 |
| 5,423,456 A | 6/1995 | Arendonk et al. | |
| 5,487,603 A | 1/1996 | Hoff et al. | |
| 5,634,713 A | 6/1997 | Abe | |
| 5,634,716 A | 6/1997 | Westall et al. | |
| 5,718,507 A | 2/1998 | Gian | |
| 5,853,244 A | 12/1998 | Hoff et al. | |
| 5,899,561 A | 5/1999 | Gian | |
| 5,957,331 A * | 9/1999 | Minor et al. | 222/56 |
| 6,056,025 A * | 5/2000 | Wegman | 141/67 |
| 6,076,109 A | 6/2000 | Kikinis | |
| 6,203,184 B1 | 3/2001 | O'Callaghan | |
| 6,243,596 B1 | 6/2001 | Kikinis | |
| 6,250,793 B1 | 6/2001 | Gian | |
| 6,329,001 B1 | 12/2001 | Ivey et al. | |
| 6,388,453 B1 * | 5/2002 | Greer | 324/667 |
| 6,519,391 B2 | 2/2003 | Kikinis | |
| 6,579,236 B2 | 6/2003 | Pratt | |
| 6,744,946 B2 | 6/2004 | Kikinis | |
| 6,805,075 B2 | 10/2004 | Pratt | |
| 6,863,913 B1 * | 3/2005 | Navin et al. | 426/231 |
| 6,901,369 B2 | 5/2005 | Cureton et al. | |
| 6,935,166 B1 * | 8/2005 | Visser | 73/73 |
| 6,991,045 B2 | 1/2006 | Vinegar et al. | |
| 7,240,807 B2 | 7/2007 | Hoff et al. | |
| 7,537,375 B2 | 5/2009 | Hoff et al. | |
| 2002/0066746 A1 | 6/2002 | Sanders | |
| 2005/0024988 A1 | 2/2005 | Hoff et al. | |
| 2005/0138993 A1 * | 6/2005 | Mattar et al. | 73/61.78 |
| 2006/0216332 A1 * | 9/2006 | Freeman et al. | 424/442 |
| 2007/0145068 A1 | 6/2007 | Hoff et al. | |
| 2008/0283551 A1 | 11/2008 | Hoff et al. | |

OTHER PUBLICATIONS

"Acuity Laser Measurement AR600 Series Laser Displacement Sensor Equipment"; Schmitt Measurement Systems, Inc.; 2004; 1 page.

"Capacitive proximity switches—Operating principle"; ifm efector; 1998-2006; 1 page.

"Distance measurement with time-of-flight principle" ifm efector; undated, 1 page.

"Efectoriso Capacitive proximity switches"; ifm electronic; Jun. 3, 2003; 2 pages.

"optoNCDT 1401: Compact CCD laser displacement sensors"; Micro-Epsilon Messtechnik GmbH & Co. KG; available at http://www.micro-spsilon.com/1400/; printed May 15, 2006, 1 pg.

"Sensing Range"; ifm efector; 1998-2006; 1 page.

"Weigh Machine GE PLC/Visual Basic Tech Manual"; Lextron Micro Tech; Document No. TSP-CNTL-006; Mar. 18, 2005; 42 pages.

J.S. Melbourne Controls, Pty Ltd, "Melbourne Hydro-Shear Mixer," pp. 1-9, Mar. 2000.

Motionless Mixer—A series (Inline) product information sheet, Komax Systems, Inc., date unknown, 3 page.

Solt, "Designing a pressure conveying system fed by a venturi," pp. 17-2, Powder and Bulk Engineering, Jul. 2001.

The Ejector Venturi Scrubber product information sheet, available at http://www.s-k.com/content/products/scrub_sys/c_scrub.htm, downloaded Dec. 19, 2002, 2pgs.

Examiner's First Report on Australian Patent Application No. 2004203491, mailed Oct. 25, 2006, 2 pgs.

Official Action for Canadian Patent Application No. 2476338, mailed Jun. 13, 2006, 3 pages.

* cited by examiner

METHOD AND SYSTEM FOR ADMINISTERING MICRO-INGREDIENT FEED ADDITIVES TO ANIMAL FEED RATIONS

CROSS REFERENCE TO RELATED APPLICATION

This application is a continuation-in-part application of co-pending application Ser. No. 10/633,463, filed Jul. 31, 2003 and entitled "METHOD AND APPARATUS FOR ADMINISTERING MICRO-INGREDIENT FEED ADDITIVES TO ANIMAL FEED RATIONS", the disclosure of which is incorporated herein by reference.

FIELD OF THE INVENTION

The present invention relates to micro-ingredients added to feed rations for animals such as livestock, and more particularly, to a method and system for administering micro-ingredient feed additives to a feed ration by utilizing various measurement techniques including bulk density measurements.

BACKGROUND OF THE INVENTION

Providing animals with various dietary supplements and medications such as vitamins, mineral, enzymes, hormones, and antibiotics is a common and well-known practice in the livestock and poultry industries. The manner in which these supplements are mixed together with a consumptive fluid carrier such as water is disclosed in a number of patents to include the U.S. Pat. Nos. 4,889,443; 4,815,042; 4,733,971; 5,219,224; and 5,487,603. In these references as well as many others, it is known to utilize automated systems which dispense discrete amounts of micro-ingredients, mix the micro-ingredients, and then deliver the micro-ingredients to a feed ration, typically in a slurry-mixture form. The prepared slurry may be fed directly to the animals, or may be added to the animal feed rations using mixing or spraying methods. Some animal feed supplements include pharmaceuticals. Mixing these pharmaceuticals with animal feed causes them to be subject to the regulations of the Food and Drug Administration (FDA). Accordingly, the locations that produce these medicated feed rations must maintain compliance with FDA regulations. Such locations may be routinely inspected by FDA personel, and are subject to various reporting requirements. Therefore, it is imperative that equipment used in the processes is capable of accurately and precisely metering, dispensing, and combining quantities of the micro-ingredients.

One focus for many of the prior references that disclose equipment used for dispensing and mixing micro-ingredients is to improve accuracy and precision in delivering the micro-ingredients. However, one particular disadvantage with many of the prior art systems is that although they may be able to accurately and precisely dispense and combine micro-ingredients, such systems may be overly complex, may be difficult to clean and maintain, and therefore increase the overall cost of managing feed operations for livestock producers.

The most common method for measuring the amount of a micro-ingredient to be used in a designated ration is use of one or more weigh scales that weigh the amount of each micro-ingredient delivered to the ration. The weight measurement may be achieved in various methods such as measurement of loss in weight or measurement of gain in weight. Loss in weight refers to measuring the weigh loss of a particular bin or container that has dispensed the micro-ingredient, the loss in weight corresponding to the amount of the micro-ingredient dispensed from the bin/container. Gain in weight refers to measuring the amount of a micro-ingredient delivered to a receiving container or bin, the increase in weight corresponding to the amount of the micro-ingredient delivered to the receiving container. Although weigh scales provide a very accurate and precise means of measuring the amount of a micro-ingredient used within a ration, the weigh scales add additional cost and complexity to an automated feed delivery system. Furthermore, the weigh scales may require special data interfaces with associated data processing equipment that receives and records the weigh scale signals. In an automated micro-ingredient delivery system, there are typically a number of storage bins and liquid containers that hold the micro-ingredients prior to delivery. Depending upon the configuration of the delivery system, it may be required to have multiple scales that therefore significantly add to the overall cost of the micro-ingredient delivery system.

Another common method of measuring the amount of a micro-ingredient that has been dispensed is measurement by volume. It is known that certain delivery mechanisms such as an auger have the capability to accurately and precisely dispense a known quantity of a micro-ingredient over a period of time. Thus, measurement of a delivered micro-ingredient can be determined on a volumetric basis wherein an amount delivered is determined by the length of time that the delivery mechanism is activated. Volume measurement is particularly useful with respect to measurement of liquid micro-ingredients.

While the prior art systems may be adequate for their intended purposes, further simplification of the components used in a micro-ingredient delivery system is advantageous if the system can continue to provide reliable results in terms of accurate and precise delivery of micro-ingredients. Accordingly, one object of the present invention is to provide a micro-ingredient delivery system that is capable of accurately and precisely manipulating the micro-ingredient for delivery to a feed ration, but such a system is made simpler by eliminating weigh scale use in favor of alternate measurement techniques.

Another object of the present invention is to provide a micro-ingredient delivery system and method that is conducive to automation through the use of one or more computers or industrial controllers such as a programmable logic controller (PLC).

It is yet another object of the present invention to provide a micro-ingredient delivery system whereby accurate records may be kept to comply with FDA or other governmental regulations.

It is yet another object of the present invention to simplify data interfaces between the devices used in the system to measure delivered micro-ingredients and the data processing equipment used in the system.

It is yet another object of the invention to provide a hybrid micro-ingredient delivery system and method that uses multiple measuring methods, and can be easily adapted for handling a wide array of micro-ingredients used in many types of ration recipes.

In all of the foregoing objects, a micro-ingredient delivery system is provided that still provides an accurate and precise means of delivering the micro-ingredients, yet the system is simplified and made more economical.

SUMMARY OF THE INVENTION

In accordance with the present invention, a system and method are provided for administrating micro-ingredient feed additives or supplements to feed rations. The system of the present invention includes a number of equipment components cooperating together to deliver the micro-ingredients to a desired location, such as a large batch of feed ration stored in a feed mixer or feed truck. The amount of each particular micro-ingredient that is to be delivered to a designated feed ration may be determined by a bulk density measurement, or bulk density measurement in combination with weight measurement and volumetric metering. For government-regulated micro-ingredients such as pharmaceuticals, it is necessary to keep records regarding the amounts of those micro-ingredients added to a particular feed ration. In accordance with the present invention, such record keeping requirements can still be complied with by measurement of the amounts delivered by a bulk density measurement method The density of a substance is the ratio of the mass of the substance to its volume. Density may be expressed in a number of ways, such as grams per cubic centimeter or pounds per cubic foot. The density of a pure substance varies very little from sample to sample, and can be considered an inherent characteristic property of the substance. The higher the density of the substance, the higher its mass per volume. The bulk density of a solid refers to the mass of the solid divided by the container volume.

In the present invention, the bulk density of each micro-ingredient is first determined and the bulk density values are stored in a data processing device of the system. Depending upon the type of micro-ingredient, environmental conditions, and other factors as discussed below, the bulk density values recorded for each micro-ingredient may be adjusted as necessary so that at the time of delivery, the recorded density bulk values are accurate for the designated delivery. The amount of a micro-ingredient delivered can be determined by measuring the amount of time the micro-ingredient is dispensed from a dispensing device. Thus, the measured time of dispensing from the apparatus along with the recorded bulk density value corresponds to a known amount of the micro-ingredient actually delivered. The amount of a micro-ingredient delivered can also be determined by a signal generated by the dispensing device, and the signal is interpreted to determine a known amount of the micro-ingredient delivered.

One example of a dispensing apparatus includes an auger that is commonly found in feed bins to dispense solid micro-ingredients. Augers are known to be accurate metering devices. Another example of a dispensing apparatus includes a metering pump, such as a positive displacement pump that accurately meters a known amount of liquid micro-ingredient over time. An example of an apparatus that accurately measures delivery by pulse count includes a flow meter. A pressurized stream of liquid flows through the flow meter, and the analog signal or pulse count generated by the flow meter corresponds to a known delivered amount of the micro-ingredient. Yet another example of devices that can be used to measure an amount dispensed are capacitive/inductive sensors and laser sensors. Similar to a flow meter, these sensors provide an electronic signal such as an analog signal, pulse or cycle count, and these signals correspond to known amounts of delivered micro-ingredients. Additionally, these types of sensors can also be used as warning sensors to indicate when a malfunction occurred during a timed delivery of a micro-ingredient. For example, for use an auger to provide a timed delivery, if the micro-ingredient to be delivered becomes clogged within the delivery tube where the auger is located, the sensor could sense the lack of product being transported through the tube, and generate a warning signal.

As mentioned above, since bulk density is used as the measurement technique, volume and weight are not required in calculating amounts to be delivered or actual amounts delivered.

The bulk density of a solid material, such as a micro-ingredient, may differ depending upon how the micro-ingredient is packaged and stored. Of course, if a micro-ingredient is compressed, its bulk density will increase whereas an uncompacted micro-ingredient will have a greater volume, thus a lower bulk density. The bulk density of a solid micro-ingredient can also change based upon differences in how a manufacturer formulates the micro-ingredient with a carrier. Many micro-ingredients are combined with a carrier, such as a rice-hull based product, and the mixture of the carrier and active micro-ingredient are packaged for delivery to a customer. Changes to the type of carrier used by the manufacturer can occur between different lots of the packaged micro-ingredient, and the bulk density of a micro-ingredient can be quite different as between manufacturers depending upon how each manufacturer formulates the micro-ingredient with a carrier.

For liquids, density is typically more uniform than solids; however, the density of a liquid is at least affected by temperature. For example, water expands as it is cooled below 3.98 degrees Celsius, thus the water decreases in density as it is cooled. As a rule of thumb, oils may be expected to increase in volume by 1% of their total volume for each 14° C. temperature increase. Thus for oils, density decreases as the oil is heated.

In accordance with the present invention, it is desirable to obtain from the manufacturer the bulk density of each package delivered so that one does not have to calculate the bulk density, it being understood that bulk density can change between lots of the same manufacturer and can also be different among manufacturers. Assuming an accurate bulk density measurement can be obtained from the manufacturer, the only corrections to the bulk density that would then be required for a solid micro-ingredient would be to account for those bulk density changes that may occur after the micro-ingredient is shipped from the manufacturer. As mentioned above for solids, bulk density can change depending upon whether the material is loose or packed. For most micro-ingredients delivered in an automated micro-ingredient delivery process, the bulk density will remain substantially constant between batches of feed ration since the micro-ingredients are presumably shipped, stored and dispensed in a consistent manner. With respect to bulk density changes of a liquid due to the affects of temperature change, assuming that temperatures can be maintained, the bulk density of a liquid micro-ingredient will remain substantially constant.

In order to validate the delivery system and/or to satisfy regulatory requirements, it may be necessary to conduct various calibrations to confirm that the bulk density values recorded for the micro-ingredients accurately correspond to amounts of micro-ingredients to be delivered. Accordingly, such calibrations can be conducted by conventional weight and/or volume measurements of the micro-ingredients. However in accordance with another aspect of the invention, an automatic calibration method is contemplated enabling system calibration during operation and without having to conduct the calibration in a separate manual effort.

In another aspect of the present invention, a hybrid micro-ingredient delivery system is contemplated wherein at least one of the micro-ingredients is delivered by bulk density measurement, while at least one other micro-ingredient is delivered by weight or volume measurement. In accordance with this hybrid system, a traditional weight/volume measurement system can be maintained and supplemented by the bulk density method of dispensing, and various combinations of measurement methods can be incorporated to best fit the needs of the feedlot organization.

DETAILED DESCRIPTION

Figure 1:
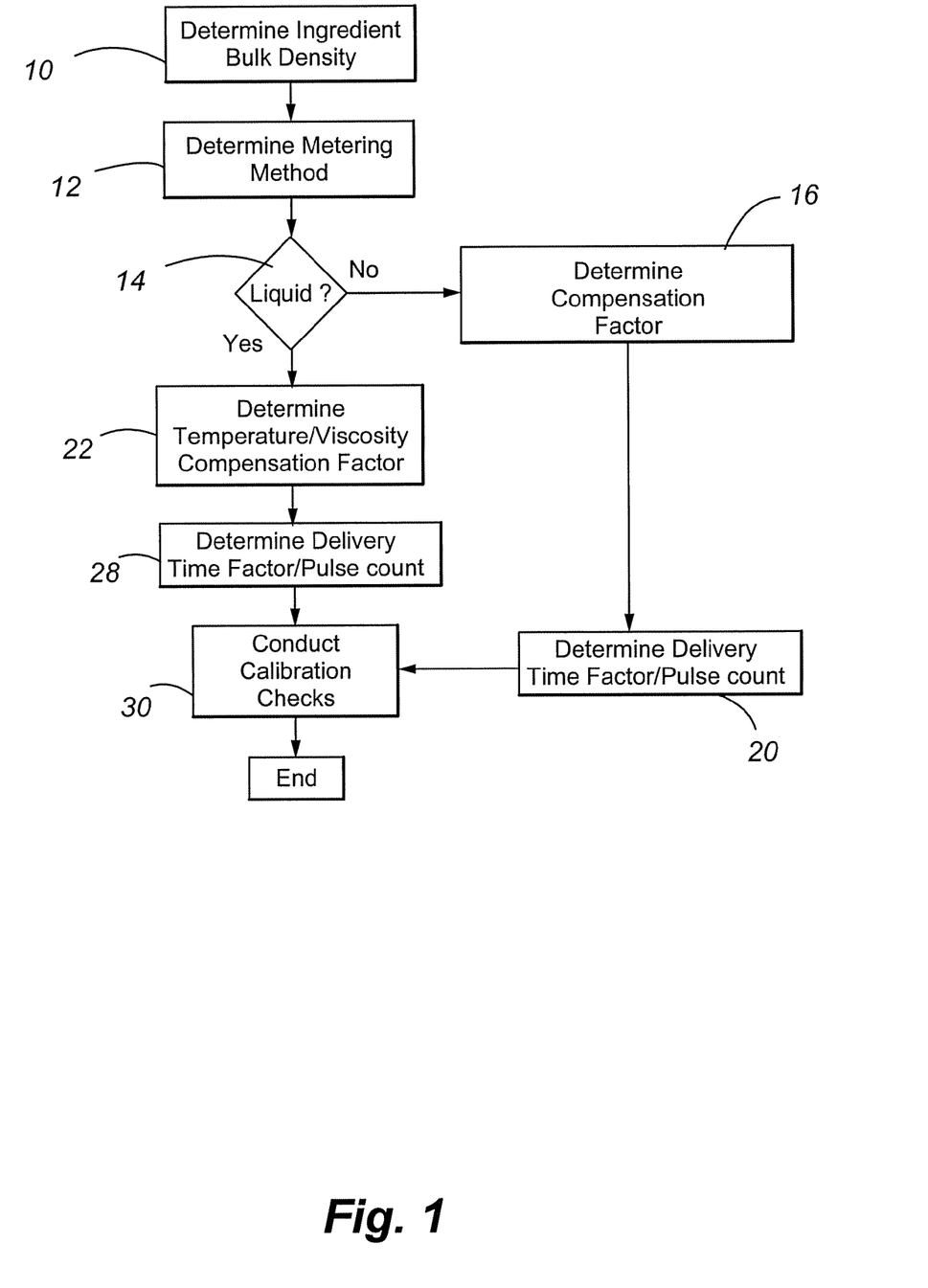
FIG. 1 is a block diagram illustrating the method of setting bulk density values for micro-ingredients in accordance with the method and system of the present invention.

FIG. 1 is a block diagram illustrating the method of setting bulk density values for micro-ingredients in accordance with the method and system of the present invention. This method is followed for each micro-ingredient to be used in a ration. Beginning at block 10, the first step is to determine the base value of the micro-ingredient bulk density. As mentioned previously, it is preferable that the manufacturers provide the bulk density for the product as delivered. In the event that the micro-ingredient manufacturer cannot readily provide the bulk density, one could simply determine this by weighing an amount of the micro ingredient and dividing the weight by the container volume that is filled by the micro-ingredient. This initial value can be defined as the base value. In block 12, the method by which the micro-ingredient is to be delivered or metered from a holding container to the ration is determined. As also mentioned above, precise metering of the ingredients can be achieved with various delivery devices such as augers, pumps, as well as flow meters used in a pressurized stream of liquid. At block 14, if the micro-ingredient to be delivered is not a liquid (therefore a solid), then as shown at block 16, a compensation factor can be determined. This compensation factor refers to any bulk density change in the micro-ingredient from determining the base value at block 10 to the time in which the micro-ingredient is delivered to a feed ration. As mentioned above, depending on how the micro-ingredient is packaged and shipped, stored, and otherwise handled in a micro-ingredient delivery system, there could potentially be some small change in the bulk density prior to delivering the micro-ingredient to a feed ration. For example, a micro-ingredient having a powder consistency may be more prone to settling and compaction in storage as opposed to micro-ingredient that has a much larger particle size. Trials can be conducted of the various micro-ingredients to determine the extent to which a loose/hard packed based compensation factor should be applied to the base value. Assuming the packaging, shipping, and micro-ingredient delivery process does not substantially change, it should be unnecessary to calculate a compensation factor between batches of rations and between different lots/deliveries of a micro-ingredient received from a manufacturer. However as mentioned above, bulk densities can and will most likely vary between different manufacturers and may vary between lots of even the same manufacturer, so establishing an accurate base value is an important step in validating the accuracy of the bulk density delivery method.

Containers that hold the micro-ingredients are typically charged each day to handle the daily ration requirements of the feed lot, each daily ration requirement comprising a number of feed batches. The containers at some point in time will hold micro-ingredients from different manufacturer lot numbers and potentially from different manufacturers. During these transition periods, some calculation can be made to determine how much of a micro-ingredient having a first lot number/manufacturer was added to a batch and how much of another lot number/different manufacturer of the same micro-ingredient was added to the same batch. This calculation can be used to adjust the bulk density values to be used in delivering the micro-ingredients. For a solid micro-ingredient stored in a container, there will primarily be stratified layers of the micro-ingredient defined by the different lots/manufacturers of the micro-ingredient added to the container. That is, unless the container is stirred, the container will dispense the micro-ingredient in the order it was added to the container—first added, first dispensed. There will also be a defined boundary layer between the different lot numbers/manufacturers of the micro-ingredient, and depending upon the type of micro-ingredient, the geometry of the container, and the manner in which the micro-ingredient is dispensed, this layer may be of different thicknesses in the container. This boundary layer generally will contain an equal mix of the two lot numbers/manufacturers. The calculation can take into account when the boundary layer is dispensed into a particular batch. For liquid micro-ingredients, it can be assumed that a container storing a liquid micro-ingredient from more than one lot number/manufacturer will result in a homogeneous mixture of the liquid. For example, a container having ¼ volume of a first lot number and ¾ volume of a second lot number will result in a batch receiving ¼ amount from the first lot number and ¾ amount from the second lot number. Accordingly, a calculation can also be made to account for the actual amounts of the two liquid micro-ingredient lot numbers/manufacturers stored in the container at the time of delivery of the liquid micro-ingredient to the feed ration. Thus, an accurate calculation can be made for both solid and liquid micro-ingredients for adjusting the bulk density values used in delivering micro-ingredients to each feed batch.

At block 20, a delivery time factor is determined which corresponds to the amount of time required to deliver a designated amount of a micro-ingredient from the designated delivery device based on the adjusted bulk density value. For example, for use of an auger or metering pump, trial runs using the designated delivery devices are conducted to determine the amount of time it takes the delivery devices to deliver designated amounts of the micro-ingredient. From the delivery trials, the amounts of the micro-ingredients delivered can be expressed as a function of time. As mentioned above, the relationship of delivery time taken in conjunction with the bulk density value of the micro-ingredient provides a known amount of micro-ingredient delivered to a feed ration. For example, if it were necessary to add one pound of a micro-ingredient to a particular batch of feed ration, the delivery of one pound would correspond to a delivery number assigned to the relationship of the adjusted bulk density and the required delivery time to transport the pound of ration. This delivery number could be either the actual amount of time required to deliver the selected amount of micro-ingredient with the selected delivery device, or some other value assigned based upon the type of delivery device and/or micro-ingredient to be delivered. For devices such as a flow meter, these devices generate pulse counts which are discrete electronic signals indicating activation cycles of the delivery device. Thus for these types of devices, a delivery number could be expressed as a function of pulse counts. If a sensor was used, such as a laser, capacitive, or inductive sensor, then the delivery number could be expressed as a function of the particular electronic signal produced by the sensor, most typically an analog signal which can be analyzed to determine the measured value dispensed. These sensors are discussed in greater detail below with respect to FIG. 6.

If the micro-ingredient to be delivered is a liquid, then there is only one likely compensation factor that should be considered in ensuring an accurate bulk density value is used. This factor is shown at block 22, namely, a temperature/viscosity compensation factor. As discussed above, the bulk density of water will decrease as it approaches its freezing point.

The frictional flow characteristics of a liquid will also change with temperature, and the viscosity of the liquid affects the manner in which it can be conveyed by a delivery mechanism. Viscosity and temperature are related and measured viscosity changes and/or temperature changes can be used to determine the extent to which the base bulk density value should be adjusted. Particularly for oil-based micro-ingredients, viscosity will increase as temperature decreases, and a compensation factor may have to be calculated for oil-based micro-ingredients that may experience use in wide temperature ranges. The actual temperatures of liquid micro-ingredients could be measured with a thermocouple and the value sent to the PLC directly or through a temperature meter. The PLC would calculate an adjusted dispense time using a viscosity vs. flow matrix. However if temperature is maintained at a constant, then no temperature/viscosity compensation factor needs to be applied to the base bulk density value. Because liquids are nearly incompressible and otherwise will not change because of other shipping and storage conditions, no other compensation factors are required.

It is also contemplated that required compensation factors could be determined as a function of the formulation information provided by a manufacturer, that is, the detailed listing of all ingredients used to formulate the packaged micro-ingredients. If a manufacturer can only provide a broad range or average value for bulk density, but does provide the detailed information on the actual formulation to include percentage weights/volumes of all ingredients, then mathematical formulas can be derived to create compensation factors to account for the formulation changes.

Block 28 illustrates determining a delivery time factor/pulse count. The delivery time factor at block 28 can be determined in the same manner as set forth above in block 20. For example, the time factor could be expressed as the amount of time required to deliver a known amount of the micro-ingredient or could be expressed in pulse counts or other values depending upon the type of electronic signal produced from the measuring device.

When an operator of a delivery mechanism is prepared to deliver the designated quantity of the micro-ingredient, the operator would simply select the desired amount of the micro-ingredient to be delivered, and the system of the present invention would then calculate the appropriate delivery number as a function of the adjusted bulk density value and time/pulse count required to deliver the selected amount. However, no actual weighing of the micro-ingredient would be required.

At block 30, an optional calibration check may be conducted to compare calculated amounts of the micro-ingredients delivered to the actual weights of the micro-ingredients delivered. As a manual calibration check, an operator could select an amount of a micro-ingredient for delivery, and then conduct a trial delivery by the selected bulk density value and time factor/pulse count. The amount actually delivered in the trial would be weighed and compared to the selected amount for delivery. An adjustment would then be made by the operator to the delivery number to account for any excessive variance in the selected versus delivered amounts. In an automated calibration check, the micro-ingredient delivery system could include a dedicated calibration container with an integral weigh scale or load cells coupled to the calibration container. The scale/load cells communicate with the computer/PLC. An operator would conduct a trial delivery of a selected amount of a micro-ingredient by selecting the bulk density value and time factor/pulse count. If an excessive variance were detected, the computer/PLC would automatically adjust the delivery number based upon either an adjusted bulk density value or an adjusted time factor/pulse count. One or more additional trial deliveries would be conducted to validate the adjusted delivery number.

If accurate bulk density values are obtained from the manufacturers, it should be understood that compensation factors would be unnecessary to calculate for most solid micro-ingredients. Any potential changes to bulk density due to packaging or storage conditions should result in negligible changes to bulk density. For liquid micro-ingredients, if accurate bulk density values are obtained from the manufactures and if temperatures are kept constant for storage of the liquid micro-ingredients prior to delivery, it should also be unnecessary to calculate compensation factors for most liquid micro-ingredients. For liquid micro-ingredients, the factor that can most greatly affect bulk density values is temperature change. Therefore, it is also contemplated within the present invention to provide temperature control for the reservoirs or containers that store the liquid micro-ingredients. Conventional heating or cooling devices may be used to ensure uniform temperatures when delivering the micro-ingredients to a feed ration.

Figure 2:
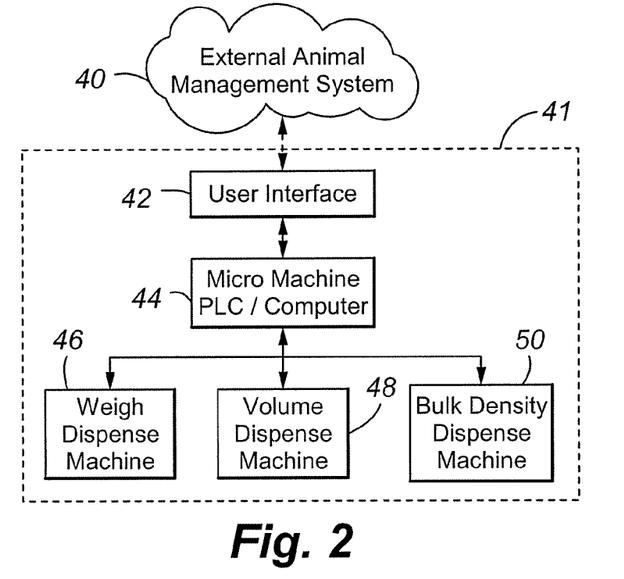
FIG. 2 is schematic diagram illustrating one preferred embodiment of the system of the present invention showing a micro-ingredient delivery system including dispensing machines for dispensing by weight, volume, and bulk density.

Referring to FIG. 2, a first embodiment of the micro-ingredient delivery system 41 is illustrated in schematic form. An external animal management system 40 provides instructions for batching of feed rations to include micro-ingredient supplements that are to be added designated feed rations. The animal management system 40 may comprise one or more data processing systems that communicate with the micro-ingredient delivery system 41 electronically, such as through the internet or a local area network. A micro-machine programmable logic controller (PLC) and/or computing device 44 communicate with the external animal management system 40 through a user interface 42. This PLC and/or computing device are referred to hereinafter as a micro-machine controller. One known arrangement is to provide a personal computer for connection to the animal management system in order to receive and store data from the animal management system, and the computer then links to the PLC in order for the PLC to physically control the dispensing devices. The personal computer may also have other functions such as inventory control and accounting functions. The micro-machine controller includes the necessary hardware and software to receive and store data from the animal management system 40, and to direct the dispensing of the micro-ingredients through the various dispensing machines that may be incorporated within the micro-ingredient delivery system 41. The PLC generates activation signals to operate the dispensing devices, such as signals to open and close valves, start and stop motors that rotate augers, etc. based on the selected delivery time factors and/or pulse counts. The PLC also receives various inputs from the dispensing devices to include inputs indicating an alarm condition, or otherwise provide the status of the devices in delivering the micro-ingredients. The user interface 42 may comprise one or more video monitors that display user screens, and one or more data entry devices such as a keyboard or mouse. Data entry may also be achieved by voice activation, those skilled having an understanding of numerous commercial software products available for achieving voice activation of a computing device. The particular software programs incorporated within the controller 44 enables a user to direct the preparation of a group of micro-ingredients to be delivered to a feed ration. The user screens enable the user to select particular types and amounts of micro-ingredients to be delivered to a batch of a designated ration, as well as to control the delivery devices through the PLC. One example of a micro-machine controller is found in the U.S. Pat. No. 5,487,603, this reference being incorporated herein for purposes of disclosing an example of a known micro-machine controller. As also shown in FIG. 2, the dispensing machines may comprise one or more conventional weigh dispense machines 46, one or more conventional volume dispense machines 48, and one or more bulk density dispense machine 50. Each weigh dispense machine 46 may include a bin or container of micro-ingredients that are dispensed into a dedicated weigh hopper, and a scale incorporated in the weigh hopper generates a signal indicative of the amount of the micro-ingredient that has been dispensed. Each volume dispense machine 48 may also include a bin or container containing a quantity of a micro-ingredient, and a metering device connected to the bin is used to meter a designated amount of the micro-ingredient. For example, the metering device could include an auger or a pump. Each bulk density dispense machine 50 comprises a bin or container of a micro-ingredient, and a metering device that meters the micro-ingredient. Metering devices that can be used with a bulk density machine are the same ones that can be used with a volume dispense machine. However, a bulk density dispense machine in this embodiment differs from a volume dispense machine in that for the bulk density machine, the user interface as well as the associated data that is stored for the particular micro-ingredients correspond to adjusted bulk density values and not volume as a function of weight. However, it should be understood that this embodiment may be modified to completely eliminate the use of any weigh dispense machine as well as the use of any volume dispense machine, thus leaving only one or more bulk density dispense machines.

Figure 3:
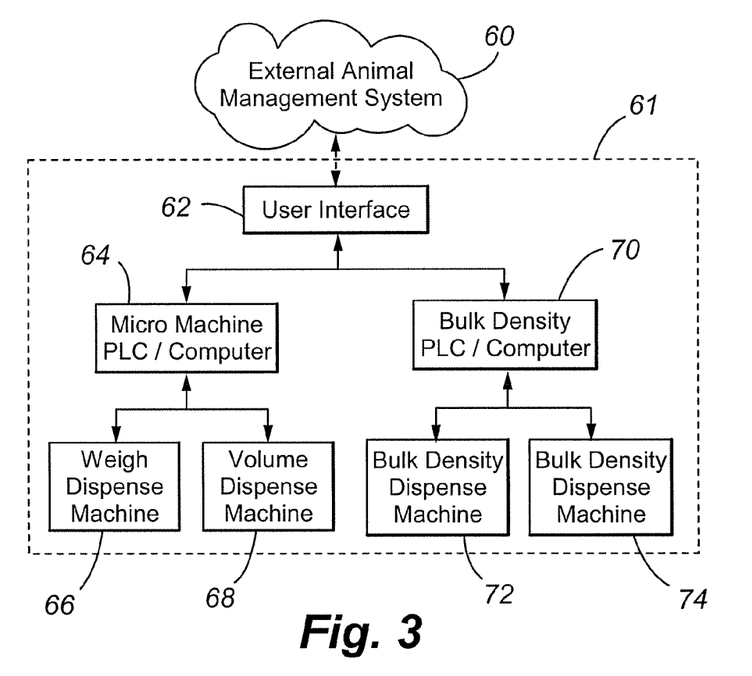
FIG. 3 is a schematic diagram illustrating another preferred embodiment of the system of the present invention wherein a separate PLC/computer controls the bulk density dispensing machines.

FIG. 3 illustrates another embodiment of the present invention. In this embodiment, a single user interface 62 interconnects an external management system 60 with a first micro-machine controller 64, and a second dedicated bulk density micro-machine controller 70. In this embodiment the controller 64 controls both a weigh dispense machine 66 and a volume dispense machine 68. The dedicated bulk density machine 70 controls a pair of bulk density dispense machines 72 and 74. The arrangement of components in this particular embodiment may be advantageous if a feedlot wishes to simply add bulk density dispensing capability, without disturbing its presently operating micro-machine system configuration. The single user interface 62 includes the necessary user screens enabling the user to simultaneously operate the dispensing machines from both the existing controller 64 and the added bulk density controller 70.

Figure 4:
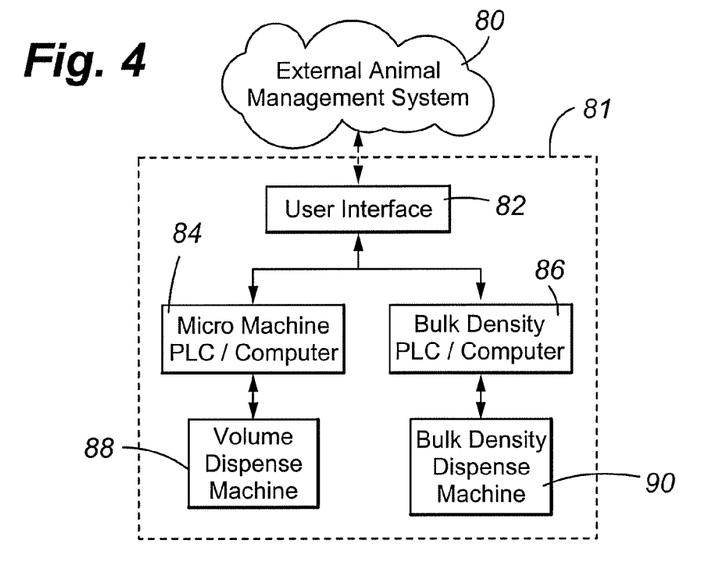
FIG. 4 is yet another schematic diagram illustrating another preferred embodiment of the system of the present invention wherein only volume and bulk density dispensing machines are used.

FIG. 4 illustrates yet another preferred embodiment of the present invention. An external animal management system 80 provides the necessary data in terms of desired micro-ingredients to be mixed with selected rations. The micro-ingredient delivery system 81 further includes a first micro-machine controller 84 which controls one or more volume dispense machines 88, and a second micro-machine controller 86 that controls one or more bulk density machines 90. A single user interface 82 allows control of both the controllers 84 and 86. This embodiment may be advantageous when an existing controller is in place along with one or more volume dispense machines, and it is desired to add a bulk density dispense capability without disturbing the volume dispense operation. Thus, system 81 does not require any weigh dispense machines.

Figure 5:
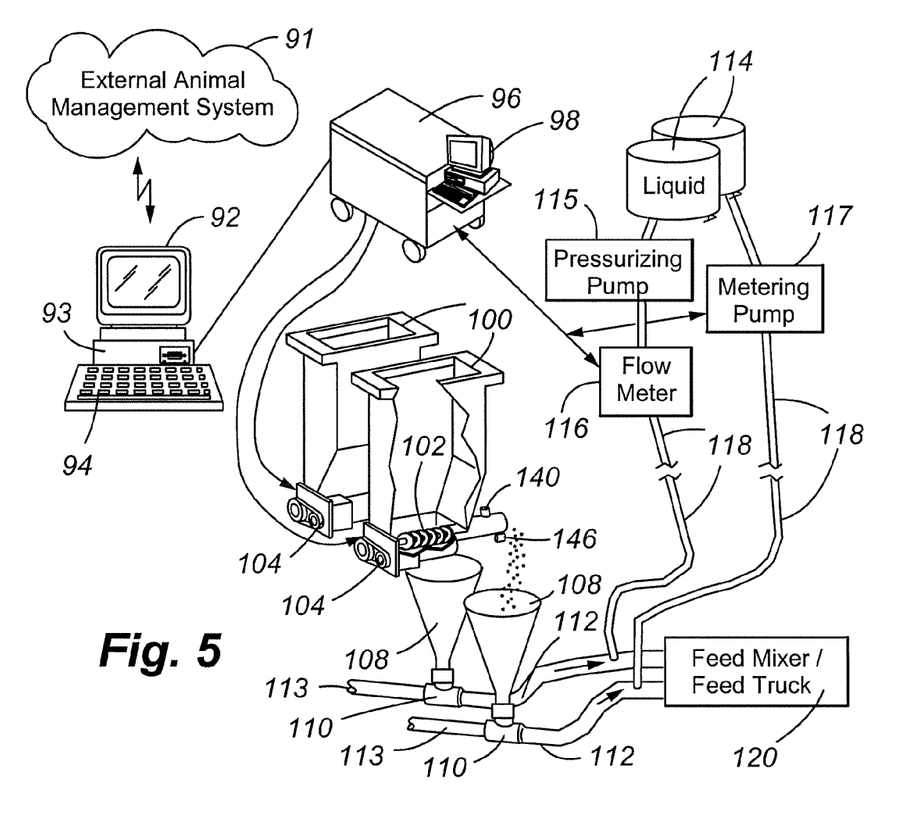
FIG. 5 is another schematic diagram showing in greater detail equipment components of a system of the present invention.

FIG. 5 illustrates a schematic diagram showing in greater detail a system of the present invention, such as the system illustrated at FIG. 2 with various dispense machines. An external animal management system 91 communicates with a computing device 93 including a monitor 92, and a keyboard 94, or other data input device. The computing device 93 runs designated software programs that control the receipt of data from the animal management system 91, handle desired accounting/inventory functions, and provide instructions to the PLC 96 for dispensing of micro-ingredients. The computing device 93 communicates with a programmable logic controller 96 that generates various outputs to the dispensing machines. The dispense machines provide various inputs to the PLC such as alarm conditions, etc. The PLC 96 may include its own user interface 98 and its own dedicated input device which controls special functioning of the PLC; however, it is contemplated that all user interfaces and controls may be achieved through the computing device 93, user interface 92 and input device 94. The PLC may be mounted in a cabinet as shown including rollers enabling the PLC to be most conveniently located near the dispensing equipment depending upon space available at the installation location. For dispensing of dry micro-ingredients, a plurality of bins or containers 100 may store various micro-ingredients. An auger 102 may be incorporated in each bin and used to dispense micro-ingredients from the containers 100. The augers 102 are controlled by corresponding motor drives 104, and the motor drives are controlled by signals generated from the PLC 96. Rotation of the augers 102 over a selected period of time for each micro-ingredient corresponds to a known amount of the micro-ingredient dispensed into hopper 106, as discussed above. It is also contemplated that an encoder could be incorporated in the rotating shaft of the auger to obtain a cycle/pulse count thereby measuring the amount dispensed. The encoder would provide a signal back to the PLC or computer reflective of the operation of the auger in terms of the number of rotations and partial rotations. The micro-ingredients can be dispensed into respective receiving tanks 108. These receiving tanks can then hold the micro-ingredients until the appropriate time to deliver the micro-ingredients to the feed mixer/feed truck. In this figure, the feed ration is temporarily stored in a feed mixer/feed truck 120, and when the feed ration has received each of its ingredients, it is delivered to the designated pens or pastures. When the micro-ingredients are ready to be delivered, valves 110 may be opened, and the micro-ingredients are evacuated from the receiving tanks through main delivery lines 112 into the feed mixer/feed truck 120. A number of means are contemplated for physically delivering the micro-ingredients from the receiving tanks 108 to the feed mixer/feed truck, to include pneumatic conveying or conveying in a slurry mixture. In the event of pneumatic conveying, lines 113 located upstream of the valves 110 could provide a stream of air to convey the micro-ingredients, or lines 113 could convey flush liquid to deliver the micro-ingredients in a slurry mixture. It shall also be understood the micro-ingredients may be directly conveyed from the receiving tanks to the feed mixer/feed truck once the desired amounts have been measured from the respective bins 100. Accordingly, the valves 110 would not be necessary to temporarily hold the micro-ingredients within the receiving tanks.

FIG. 5 also shows liquid micro-ingredients stored in liquid containers 114. Liquid micro-ingredients are shown as being delivered in two methods. The first method utilizes a pressurizing pump 115 in combination with a flow meter 116. The activation of the pump 115 is controlled by the PLC 96 wherein the pressurization pump is activated based upon a pulse count provided from the flow meter 116 measuring the actual amount delivered. The other method utilizes a metering pump 117 that is controlled by the PLC wherein a timed operation of the metering pump corresponds to a known amount of micro-ingredient delivered. As also discussed above with respect to incorporation of an encoder on an auger-type delivery device, an encoder may also be integrated in the shaft of the motor driving the pump enabling operation of the pump to be defined by a pulse count. Lines 118 convey the liquid micro-ingredients to main delivery lines 112 where the liquid micro-ingredients may join the dry micro-ingredients on their route to the feed mixer/feed truck 120.

Figure 6:
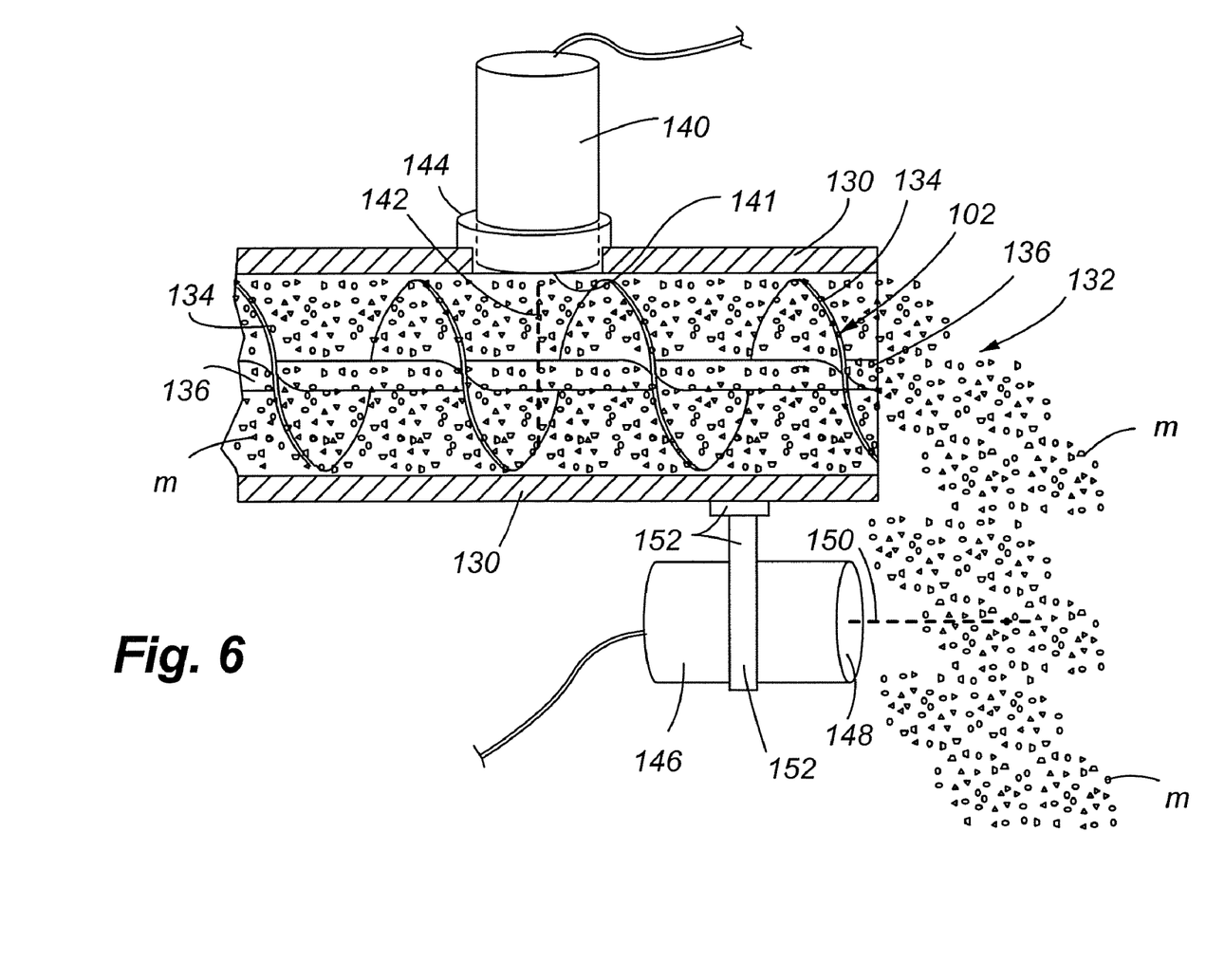
FIG. 6 a cross sectional view of an auger used to dispense micro-ingredients from a storage bin wherein sensors are incorporated to sense the presence of the micro-ingredients as they are dispensed.

Referring now to FIG. 6, one arrangement is shown of sensors used to measure amounts of micro-ingredients dispensed and/or to detect the presence/absence of micro-ingredients being delivered. As shown, a conveying tube 130 houses the dispense auger 102. The auger is defined by a continuous helical flight 134 that extends from a central shaft 136. The outlet 132 of the tube 130 allows the micro-ingredients m to fall into the corresponding container 108. A first sensor 140 is mounted to an outer surface of the tube 130 as by a bracket 144. An opening formed in the tube allows the sensing end 141 of the sensor to be disposed in the tube 130. A general sensing axis 142 defines the direction in which the sensor 142 senses the micro-ingredient m as it is metered through the tube 130. A second sensor 146 is mounted to the tube 130 as by a bracket 152 so the sensor 146 is positioned below the outlet 132 and adjacent the falling stream of micro-ingredient material as it falls into the container 108. As shown, the sensor 146 has a sensing end 148 wherein a general sensing axis 150 defines the direction in which the sensor 148 senses the micro-ingredients m. The sensors 140 and 146 can be used to measure the amounts of the micro-ingredients m that pass by the sensors. Alternatively, one sensor can be used to measure dispensed amounts, while the other sensor can be used simply as a warning sensor to detect the presence/absence of the micro-ingredients. For example, if micro-ingredient material becomes bridged or clogged within the tube 130, the sensor 140 could sense the lack of micro-ingredient material between adjacent flights of the auger thereby providing an input to the controller in order to suspend or stop the delivery until the problem is remedied. Similarly, any interruption in the stream of micro-ingredient material passing before the sensor 146 can enable sensor 146 to provide an input to the controller that the flow of micro-ingredient material has been interrupted or lost. With respect to the functioning of a laser sensor, one acceptable type of sensor that can be used includes the AR200 Acuity laser measurement sensor manufactured by Schmitt Measurement Systems, Inc. of Portland Oreg. This laser sensor, like many other similar laser sensors, employs triangulation measurement principles with an imaging detector array. A beam of visible laser light creates a spot on the target surface. The reflected light is captured on the imaging array, such as a CCD array. The target's distance can then be computed from the image pixel data. In the present invention, the size and geometry of the auger and tube can be taken into consideration to allow data from the sensor to be correlated with an amount of the micro-ingredient being conveyed at the time. The distance measured by the laser sensor will essentially provide an indication as to how full the tube is at any selected time of the micro-ingredient, which is a direct function as to the volume of the micro-ingredient passing through the tube. If the bulk density of the micro-ingredient is known, the data gathered from the sensor can be used to calculate an amount of the micro-ingredient dispensed. With respect to the functioning of a capacitive sensor to determine the presence or absence of micro-ingredient material, one acceptable type of sensor that can be used includes the K10202 capacitive proximity switch manufactured by IFM Efector, Inc. of Exton, Pa. This type of sensor includes an electrode assembly, an oscillator circuit, an evaluation circuit, and an output circuit. The electrode assembly creates an electrostatic field between a pair of electrodes. Any object entering this field will increase the capacitance depending on the distance and the position of the object, dimension of the object, and dielectric constant of the object. An increase of sufficient magnitude will create an oscillation, and the evaluation circuit detects the oscillation and changes in the state of the output. Small changes in capacitance influences oscillation amplitude, and sensitivity can be set to provide desired detection parameters.

By the system and method of the present invention, micro-ingredients may be delivered to a feed ration in a precise and accurate yet economical manner. Measuring amounts of micro-ingredients by bulk density eliminates the need for multiple scales, thereby simplifying the overall components required in a micro-ingredient delivery system. The bulk density capability may be easily integrated into existing micro-ingredient systems, or may be provided in a new system incorporating selected delivery machines.

With respect to the method of determining delivered amounts of micro-ingredients by using a bulk density measurement, it shall be understood that this method is independent of any specific equipment arrangement illustrated above, it being understood that many other types of equipment arrangements may be incorporated within a micro-ingredient delivery system that take advantage of bulk density measurement as opposed to volumetric metering or weighing of micro-ingredients, or using a bulk density measurement in conjunction with volumetric metering and/or weighing methods.

While the present invention has been disclosed with reference to various preferred embodiments, it shall be understood that the present invention is subject to various changes and modifications that may fall within the scope of the claims appended hereto.

What is claimed is:

1. A method of measuring micro-ingredients delivered to a feed ration, said method comprising the steps of:
   determining a bulk density for at least one micro-ingredient;
   assigning a base value to the bulk density;
   dispensing the micro-ingredient from a dispensing device;
   recording the length of time in which the dispensing device operated to dispense the micro-ingredient;

calculating an amount of the micro-ingredient delivered taking into account the bulk density value and the length of time;
determining a compensation factor without weighing the micro-ingredient, said compensation factor being derived from consideration of at least one factor of a plurality of factors including temperature, viscosity, and loose/hard packed packaging and storage conditions;
adjusting the base value of the bulk density by the compensation factor; and
calculating a revised amount of the micro-ingredient delivered taking into account the adjusted bulk density value and the length of time.

2. A method, as claimed in claim 1, wherein:
said dispensing step is achieved by use of at least one of an auger and a pump.

3. A method, as claimed in claim 1, further comprising the step of:
validating the bulk density value by comparing the calculated amount of the micro-ingredient dispensed to a weight of the micro-ingredient dispensed.

4. A method of measuring micro-ingredients delivered to a feed ration, said method comprising the steps of:
determining a bulk density for at least one micro-ingredient;
assigning a base value to the bulk density;
dispensing the micro-ingredient from a dispensing device;
recording dispensing of the micro-ingredient, said recording being a count of units;
calculating a revised amount of the micro-ingredient delivered taking into account the bulk density value and the recorded units; and
determining a compensation factor without weighing the micro-ingredient, said compensation factor being derived from a calculation of at least one factor of a plurality of factors including temperature, viscosity, and loose/hard packed packaging and storage conditions;
adjusting the base value of the bulk density by the compensation factor; and calculating a revised amount of the micro-ingredient delivered taking into account the adjusted bulk density value and the recorded units.

5. A method, as claimed in claim 4, wherein:
said recorded units comprise pulse counts.

6. A method, as claimed in claim 4, wherein:
said dispensing step is achieved by use of at least one of an auger and a pump.

7. A method, as claimed in claim 4, wherein said recording step is achieved by use of at least one of a flow meter and a sensor.

8. A method, as claimed in claim 7, wherein said sensor includes at least one of a capacitive sensor, an inductive sensor, and a laser sensor.

9. A method of measuring micro-ingredients delivered to a feed ration, said method comprising the steps of:
determining a bulk density for at least one micro-ingredient; assigning a base value to the bulk density;
dispensing the micro-ingredient from a dispensing device; recording dispensing of the micro-ingredient, said recording being a count of units;
calculating an amount of the micro-ingredient delivered taking into account the bulk density value and the recorded units; and
validating the adjusted bulk density value by comparing the calculated amount of the micro-ingredient dispensed to a volume of the micro-ingredient dispensed.

10. A method of measuring micro-ingredients delivered to a feed ration, said method comprising the steps of:
determining a bulk density for at least one micro-ingredient; assigning a base value to the bulk density;
dispensing the micro-ingredient from a dispensing device; sensing the micro-ingredient as it is dispensed;
calculating an amount of the micro-ingredient delivered taking into account the base value of the bulk density and a signal generated in response to the sensing step; and
determining a compensation factor without weighing the micro-ingredient, said compensation factor being derived from consideration of at least one factor of a plurality of factors including temperature, viscosity, and loose/hard packed packaging and storage conditions; adjusting the base value of the bulk density by the compensation factor; and calculating a revised amount of the micro-ingredient delivered taking into account the adjusted bulk density value.

11. A method, as claimed in claim 10, wherein:
said sensing step incorporates a laser sensor to provide said signal, said signal being used to correlate a volume of the micro-ingredient to an amount of the micro-ingredient delivered.

12. A method of measuring micro-ingredients delivered to a feed ration, said method comprising:
determining a bulk density of at least one micro-ingredient; assigning a base value to the bulk density;
dispensing the micro-ingredient from a dispensing device; determining an amount of the micro-ingredient delivered taking into account the base bulk density value;
determining a compensation factor, said compensation factor being derived from a consideration of a boundary layer comprising at least two different micro-ingredients and without weighing the micro-ingredients;
adjusting the base bulk density value by the compensation factor;
and calculating a revised amount of the micro-ingredient delivered taking into account the adjusted bulk density value.

13. A method of measuring micro-ingredients delivered to a feed ration, said method comprising:
determining a bulk density of at least one micro-ingredient; assigning a base value to the bulk density;
dispensing the micro-ingredient from a dispensing device; determining an amount of the micro-ingredient delivered taking into account of the bulk density value;
determining a compensation factor, said compensation being derived from a consideration of proportional amounts of at least two different liquid micro-ingredients and without weighing the micro-ingredients;
adjusting a base value of the bulk density by the compensation factor; and
calculating a revised amount of the micro-ingredient delivered taking into account the adjusted bulk density value.

* * * * *